(12) United States Patent
Yamane (10) Patent No.: US 9,031,691 B2
(45) Date of Patent: May 12, 2015

(54) SYSTEMIC DERIVATION OF SIMPLIFIED DYNAMICS FOR HUMANOID ROBOTS

(71) Applicant: Disney Enterprises, Inc., Burbank, CA (US)

(72) Inventor: Katsu Yamane, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 130 days.

(21) Appl. No.: 13/784,405

(22) Filed: Mar. 4, 2013

(65) Prior Publication Data

US 2014/0249670 A1 Sep. 4, 2014

(51) Int. Cl.
*G06F 19/00* (2011.01)
*B25J 9/16* (2006.01)

(52) U.S. Cl.
CPC .............. *B25J 9/1602* (2013.01); *Y10S 901/01* (2013.01); *B25J 9/1605* (2013.01); *B25J 9/1607* (2013.01)

(58) Field of Classification Search
USPC .............................................. 700/245; 901/1
See application file for complete search history.

(56) References Cited

U.S. PATENT DOCUMENTS

| | | | | |
|---|---|---|---|---|
| 5,159,249 | A * | 10/1992 | Megherbi | 318/568.1 |
| 8,364,314 | B2 * | 1/2013 | Abdallah et al. | 700/264 |
| 2010/0280663 | A1 * | 11/2010 | Abdallah et al. | 700/264 |
| 2012/0173021 | A1 * | 7/2012 | Tsusaka | 700/258 |
| 2012/0290131 | A1 * | 11/2012 | Khoukhi | 700/250 |
| 2013/0144441 | A1 * | 6/2013 | Kanazawa et al. | 700/263 |
| 2013/0238183 | A1 * | 9/2013 | Goulding | 701/26 |

OTHER PUBLICATIONS

S. Lall; P. Krysl; and J. Marsden, "Structure-preserving model reduction for mechanical systems," Physica D, vol. 184, pp. 304-318, 2003.
A. Treuille; A. Lewis; and Z. Popovie, Model reduction for real-time fluids,"Model reduction for real-time fluids," ACM Transactions on Graphics, vol. 25, No. 3, pp. 826-834, 2006.
D. James and D. Pai, "Mutliresolution Green's function methods for interactive simulation of large-scale elasostatic objects," ACM Transactions on Graphics, vol. 22, No. 1, pp. 47-82, 2003.
S.Kajita and K. Tani, "Experimental Study of biped Dynamic Walking in the Linear Inverted Pendulum Mode," in Proceedings of the IEEE International Conference on Robotics and Automation, Nagoya, Japan, May 1995, pp. 2885-2891.

(Continued)

*Primary Examiner* — Ronnie Mancho
(74) *Attorney, Agent, or Firm* — Patterson & Sheridan LLP (57) ABSTRACT

The disclosure provides an approach for determining simplified models of humanoid robots. A simplification application linearizes a robot model around a nominal state and performs a singular value decomposition of an inertial term of the model, selecting singular values and corresponding singular vectors to be kept in an inertial term of a simplified model by matching a kinetic energy of the original model to a kinetic energy of the simplified model. Further, a gravitational forces term and a velocity-dependent forces term may be determined by computing active joint torques at sample poses around the nominal pose and solving for the gravitational forces term and the velocity-dependent forces term. A mapping from the simplified model to the original model may be determined using, e.g., numerical optimization.

16 Claims, 4 Drawing Sheets

(56) References Cited

OTHER PUBLICATIONS

S. Kajita; F. Kanehiro; K. Kaneko; K. Fujiwara; K. Harada; K. Yokoi; and H. Hirukawa, "Biped walking pattern generation by using preview control of zero-moment point," in Proceedings of IEEE Internationl Conference on Robotics and Automation, 2003, pp. 1620-1626.

J. Pratt; J. Carff; S. Drakunov; and A. Goswami, "Capture point: A step toward humanoid push recovery," in Proceedings of IEEE-RAS Internation Conference on Humanoid Robots, 2006, pp. 200-207.

S. Lee and A. Goswami, "Reaction mass pendulum (RMP): An explicit model for centroidal angular momentum of humanoid robots," in Roceedings of IEEE International Conference on Robotics and Automation, 2007, pp. 4667-4672.

B. Stephens, "Integral control of humanoid balance," in Proceedings of IEEE/RSJ International Conference on intelligent Robots and Systems, 2007, pp. 4020-4027.

B. Stephens and C. Atkeson, "Modeling and control of periodic humanoid balance using the liner biped model," in Proceedings of IEEE-RAS International Conference on Humanoid Robots, 2009, pp. 379-384.

A. Goswami, "Kinematic and dynamic analogies between planar biped robots and the Reaction Mass Pendulum (RMP) model," in Proceedings of IEEE-RAS International Conference on Humanoid Robots, 2008, pp. 182-188.

D. Hyland and D. Bernstein, "The optimal projection equations for model reduction and the relationships among the methods of Wilson, Skelton, and Moore," IEEE Transactions on Automatic Control, vol. AC-30, No. 12, pp. 1201-1211, 1985.

P. Gill; W. Murray; and M. Saunders, User's guid for SNOPT Version 7: software for Large-Scale Nonlinear Programming. Http://www.cam.ucsd.edu/peg/papers/sndoc7.pdf, 2006.

R. Tedrake, "LQR-Trees: Feedback motion planning on sparse randomized trees," in Proceedings of Robotics: Science and Systems, 2009, pp. 17-24.

T. Sugihara; Y.Nakamura; and H. Inoue, "Realtime Humanoid Motion Generation through ZMP Manipulation based on Inverted Pendulum Control," in Proceedings of the IEEE International Conference on Robotics and Automation, Washington DC, May 2002, pp. 1404-1409.

K. Yamane and J. Hodgins, "Simultaneous tracking and balancing of humanoid robots for imitationg human motion capture data," in Proceedings of IEEE/RSJ International Conference on Intelligent Robot Systems, St. Louis, MO, Oct. 2009, pp. 2510-2517.

* cited by examiner

SYSTEMIC DERIVATION OF SIMPLIFIED DYNAMICS FOR HUMANOID ROBOTS

BACKGROUND

1. Field

Embodiments presented herein provide techniques for simplifying models of robots, and, in particular, for systematically deriving simplified models of humanoid robots.

2. Description of the Related Art

In humanoid robot control, simplified dynamics models are often used to represent the robot, as it is difficult to design controllers that control full dynamics models having many degrees of freedom (DOF). Typically, simplified models have fewer DOF than full models and are linearized in order to apply linear control theory. Examples of simplified models include the one-joint inverted pendulum model, the two-joint inverted pendulum model, the cart-table model, the inverted pendulum with reaction wheel, the double inverted pendulum, and the linear biped model. Conventionally, controller developers formulate these models manually based on their intuition. This approach is difficult to generalize, and it is not always clear how to determine parameters of a simplified model, or if the simplified model captures the essential dynamics of the full model. Further, model-specific programs, each of which can be employed with particular model(s), may be required to compute the state of the simplified models. For example, a one-joint inverted pendulum model may use the center-of-mass (COM) of the entire body and thus require a different program than a two joint inverted pendulum model that uses separate COMB for the upper and lower body. In addition, joints of simplified models may not correspond to physical joints, so converting between input torques of simplified models and joint torques of full models may not be straightforward, especially since no systematic approach exists for performing such a conversion.

SUMMARY

One embodiment of the invention includes a method for simplifying a robot model. This method may generally include performing a singular value decomposition of an inertial term of the robot model and determining singular values and corresponding singular vectors to keep in an inertial term of a first simplified model by matching a kinetic energy of the robot model and a kinetic energy of the first simplified model.

In a particular embodiment, this method may further include linearizing the robot model around a first nominal state and may further include determining a gravitational forces term and a velocity-dependent forces term of the first simplified model by computing joint torques at sample poses around the first nominal state and solving for the gravitational forces term and the velocity-dependent forces term. In yet a further embodiment, this method may also include controlling the first simplified model using a first controller and determining joint torques and expected contact forces for the robot model from an input and reference trajectory of the first simplified model by optimizing a cost function.

Other embodiments include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Embodiments disclosed herein provide techniques for systematically determining simplified models of humanoid robots. As used herein, a model includes one or more equations with mass and dynamic properties of a robot, having joint torques as inputs and motion of the robot as output. Techniques disclosed herein permit a model having degrees of freedom (DOF) to be simplified to a model having a user-specified number of DOF k, where k is less than n. A simplification application linearizes the robot model around a nominal state and performs a singular value decomposition of an inertial term of the model, selecting singular values and corresponding singular vectors to be kept in an inertial term of a simplified model by matching a kinetic energy of the original model to a kinetic energy of the simplified model. In one embodiment, the inertial term may be an inverse inertial matrix of a system constrained by contact constraints, and the smallest k nonzero singular values and their corresponding singular vectors may be kept. Further, a gravitational forces term and a velocity-dependent forces term may be determined by computing active joint torques at sample poses around the nominal pose and solving for the gravitational forces term and the velocity-dependent forces term. A mapping from the simplified model to the original model may be determined using, e.g., numerical optimization. The simplified model may then be controlled using a controller which, based on the current state of the simplified model, computes input(s) to the model needed to achieve a given control objective (e.g., returning to the nominal pose). In one embodiment, the controller may be an infinite-horizon linear quadratic regulator, and an observer may be used to estimate the state of the simplified model based on measurements from the robot. In addition, joint torques of the original model may be sent to joint controllers of the robot being modeled to cause the robot to move. Note, although discussed primarily with respect to humanoid robots, techniques disclosed herein may be applied to other types of robots (e.g., other legged robots) as well.

The following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and flowchart illustrations, and combinations of blocks in the block diagrams and flowchart illustrations can be implemented by special-purpose hardware-based systems that perform the specified functions or acts, or combinations of special purpose hardware and computer instructions.

Figure 1:
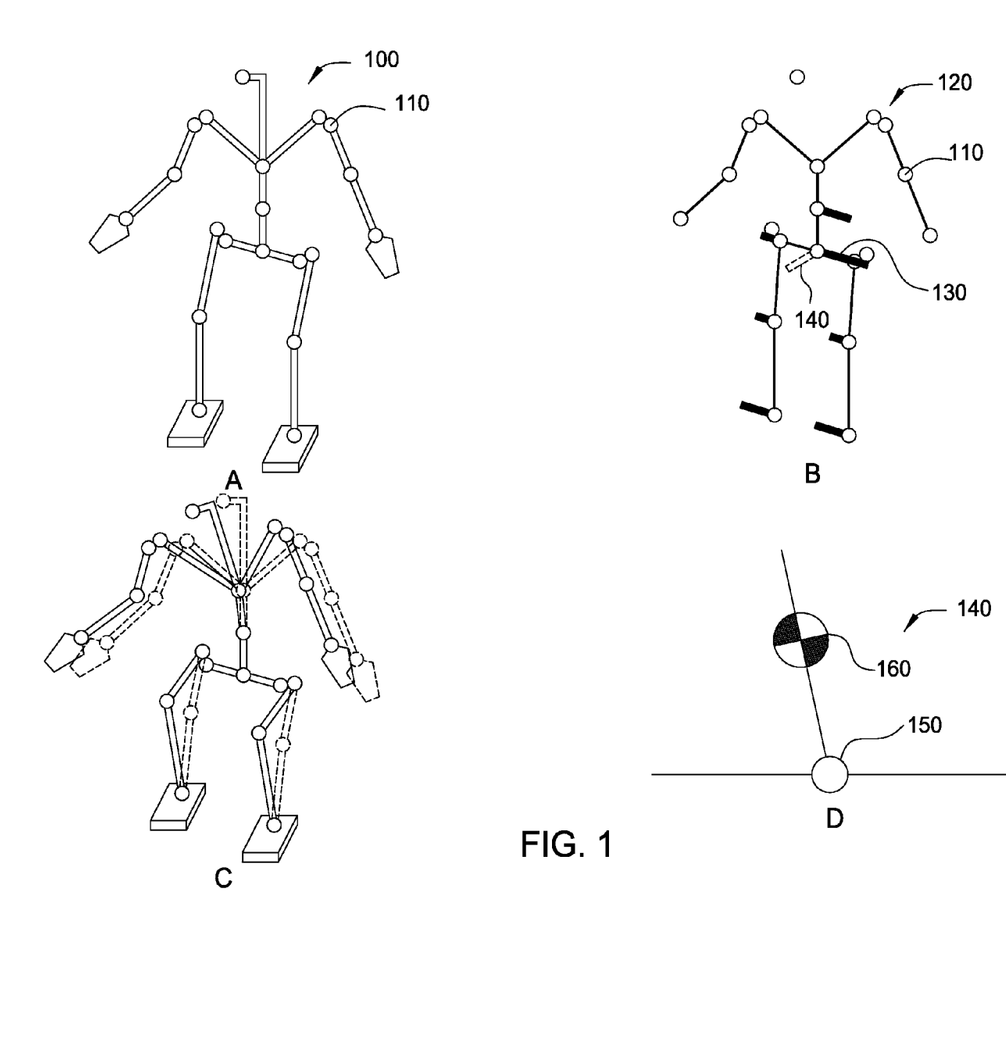
FIG. 1 illustrates a systematic approach for deriving a simplified model of a humanoid robot, according to an embodiment of the invention.

FIG. 1 illustrates a systematic approach for deriving a simplified model of a humanoid robot, according to an embodiment. As shown in panel A, a full dynamics model of a humanoid robot 100 may model the robot 100 using a set of equations having joint torques as inputs and motion of the robot 100 as output. Illustratively, the humanoid robot 100 includes joints $110_i$ that correspond to joints of a human. A full dynamics model of the robot 100 may thus have, e.g., n=38 DOF (32 rotational joints) and flat contacts at both feet. Embodiments described herein permit such models to be simplified to models having a user-specified number of DOF (e.g., 2 DOF) that is less than that of the full dynamics model.

Where one or more links of the humanoid robot 100 are in contact with the environment, enforcing m independent constraints, and the robot 100 has n DOF, 6 of which correspond to the translation and rotation of the base body and are thus not actuated, the full dynamics of the robot 100 may be described by the following equation:

$$M(\theta)\ddot{\theta}+c(\theta,\dot{\theta})+g(\theta)=S^T\tau+J_C^T(\theta)f_C, \quad (1)$$

where
$\theta \in R^n$: generalized coordinates
$\tau \in R^{n-6}$: active joint torques
$f_C \in R^m$: contact forces
$M(\theta) \in R^{n \times n}$: joint-space inertia matrix
$c(\theta,\dot{\theta}) \in R^n$: centrifugal and Coriolis forces
$g(\theta) \in R^n$: gravitational force
$J_C(\theta) \in R^{m \times n}$: contact Jacobian matrix
and $S^T \in R^{m \times (n-6)}$ is the matrix that converts active joint torques to generalized forces and typically has the form $$S^T = \begin{pmatrix} 0_{6 \times (n-6)} \\ 1_{(n-6) \times (n-6)} \end{pmatrix} \quad (2)$$

where 0, and 1, represent the zero and identity matrices of the size indicated by the subscript. The contact constraint may be represented as $$J_C\ddot{\theta}+\dot{J}_C\dot{\theta}=0_m. \quad (3)$$

Here, the relationship between generalized acceleration $\ddot{\theta}$ and active joint torques $\tau$ may be obtained by: 1) solving equation (1) for $\ddot{\theta}$ and plugging in the result into equation (3); 2) solving the resulting equation for $f_C$; 3) plugging $f_C$ back into equation (1). Doing so results in $$\ddot{\theta}=\Phi(\theta)S^T\tau+\phi(\theta,\dot{\theta}) \quad (4)$$

where $$\Phi(\theta)=M^{-1}-M^{-1}J_C^T(J_CM^{-1}J_C^T)^{-1}J_CM^{-1}$$

$$\phi(\theta,\dot{\theta})=-M^{-1}J_C^T(J_CM^{-1}J_C^T)^{-1}\dot{J}_C\dot{\theta}-\Phi(c+g).$$

Equation (4) describes the relationship between active joint torques and joint accelerations (including the base body), assuming that the contact constraints are satisfied. Note that while M is positive definite, $\Phi$ is only positive semi-definite due to the contact constraints, and therefore $\Phi^{-1}$ cannot be computed. This property corresponds to the fact that a $\ddot{\theta}$ that violates the contact constraints cannot be generated by any generalized force.

Panels B-C show steps in a process for simplifying the model of equation (4), according to an embodiment. The objective of simplification is to approximate the dynamics of the humanoid robot with n degrees of freedom (DOF), and possibly subject to contact constraints, by a k ($\ll$n)-DOF linear system $$\hat{M}\ddot{q}+\hat{C}\dot{q}+\hat{G}q=u \quad (5)$$

where $q \in R^k$ is the generalized coordinate of the simplified model, $u \in R^k$ is the input force to the simplified model, $\hat{M} \in R^{k \times k}$ is a symmetric, positive-definite inertia matrix, and $\hat{C} \in R^{k \times k}$ and $\hat{G} \in R^{k \times k}$ are constant matrices. Note, the value of k may be entered by a user or, alternatively, automatically determined. For the user may set a threshold for singular values, discussed in greater detail below, and the simplification application may automatically determine singular values that satisfy this condition. As another example, the simplification application may be configured to select singular values with large gaps between them.

Because $\hat{M}$ is positive definite, equation (5) may be written as $$\ddot{q} = \hat{\Phi} u - \hat{\Phi}\hat{G}q - \hat{\Phi}\hat{C}\dot{q} \qquad (6)$$

where $\hat{\Phi} = \hat{M}^{-1}$. The state-space differential equation model may then be derived as $$\dot{x} = Ax + Bu \qquad (7)$$

by defining $$x = \begin{pmatrix} q \\ \dot{q} \end{pmatrix}$$

$$A = \begin{pmatrix} 0_{k \times k} & 1_{k \times k} \\ -\hat{\Phi}\hat{G} & -\hat{\Phi}\hat{C} \end{pmatrix}$$

$$B = \begin{pmatrix} 0_{k \times k} \\ \hat{\Phi} \end{pmatrix}.$$

To determine a simplified model of form in equation (7) for a given full dynamics model, a simplification application may first linearize the non-linear equation (4) for the full model around a given nominal state $(\theta^T, \dot{\theta}^T)^T = (\theta_0^T, \theta_n^T)^T$, as the ultimate goal is to derive a linear model. Then, the simplification application may determine the $\hat{\Phi}$ matrix by performing singular value decomposition of the inverse inertial matrix of the constrained system $\Phi_0$ and selecting particular singular values and vectors to keep. Illustratively, panel B shows components of a singular vector that corresponds to a smallest non-zero singular value (i.e., the largest inertia) for a standing nominal pose. As discussed in greater detail below, the smallest k non-zero singular values and their corresponding singular vectors may be kept for a given nominal pose so as to minimize the difference in kinetic energy between the original model and the simplified model.

As shown, singular vector elements of the smallest non-zero singular value are represented by solid and dashed bars starting from corresponding joints. For each rotational joint and the base body, a solid bar parallel to an axis of a rotational degree of freedom is depicted with length proportional to the magnitude of the corresponding singular vector element. If an element has negative value, its corresponding bar points in a direction opposite the axis. For example, bar 130 shows that a singular vector element corresponding to hip rotation has a large positive value, indicating a rotation of the hip that causes the robot to lean forward in the standing nominal pose. Dotted bars represent singular vector elements corresponding to linear degrees of freedom of the base body of the robot. For example, dotted bar 140 shows that a singular vector element corresponding to hip translation has a large positive value, indicating a translation forward in the standing nominal pose. In selecting singular values, the simplification application may attempt to minimize the difference between a kinetic energy of the simplified model and a kinetic energy of the full model, as discussed in greater detail below.

As shown in panel C, the simplification application may determine the $\hat{G}$ and $\hat{C}$ matrices by computing active joint torques z at random poses around the nominal pose, thereby obtaining linear models of the gravitational forces term $\hat{G}$ and the velocity-dependent forces term $\hat{C}$. In one embodiment, a sampling-based numerical approach may be used. As discussed in greater detail below, the $\hat{G}$ and $\hat{C}$ matrices may be determined by computing joint torques via inverse kinematics at sample poses around the nominal pose, then solving for $\hat{G}$ and $\hat{C}$. The state-space model of equation (7) may then be obtained by plugging in the $\hat{G}$, $\hat{C}$, and $\Phi_0$ matrices.

Panel D shows an inverted pendulum model 140, which is similar to a simplified model that uses the first singular value discussed above. Illustratively, the inverted pendulum model 140 includes one joint 150 on the ground, and has center of mass 160 above the joint 150. As discussed, the singular vector for a smallest non-zero singular value corresponds to leaning forward, which is similar in motion to that of the inverted pendulum model 140. Experience has shown that the standing nominal pose has other non-zero singular values that correspond to leaning left (similar to a single-inverted pendulum in the coronal plane), bending the upper body to the left (similar to the second joint of the two-joint inverted pendulum model in the sagittal plane), twisting the body to the right (not similar to any traditional simplified model), bending the upper body forward (similar to the second joint of the two-joint inverted pendulum model in the coronal plane), swinging both arms inwards (similar to the changing the inertia around the center of mass (COM), which is modeled in the Reaction Mass Pendulum model), swinging both arms backwards, and swinging both arms to the right (the last two of which are similar to shifting the COM without changing the contact point, which is modeled in the cart-table model). In general, k smallest non-zero singular values and corresponding singular vectors may be kept to obtain a simplified model having k DOF. Note, the motions corresponding to the remaining singular values and vectors may be lost in such a simplified model.

As discussed in greater detail below, a mapping from the simplified model to the original model may be determined using, e.g., numerical optimization. The simplified model may then be controlled to perform a motion (e.g., returning to the nominal pose) using a controller, such as an infinite-horizon linear quadratic regulator. In addition, joint torques may be sent to joint controllers of the robot being modeled to cause the robot to move.

Figure 2:
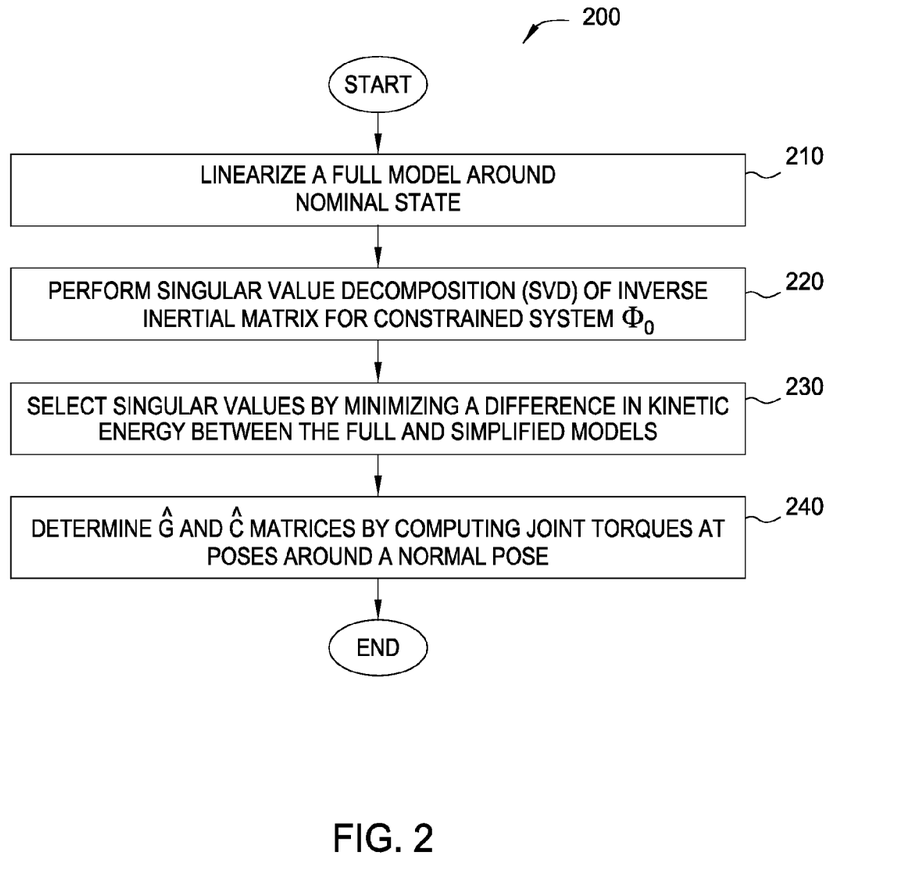
FIG. 2 illustrates a method for determining a simplified robot model, according to an embodiment of the invention.

FIG. 2 illustrates a method 200 for determining a simplified robot model, according to an embodiment. As shown, the method 200 begins at step 210, where a simplification application linearizes a full model around a nominal state, $(\theta^T, \dot{\theta}^T)^T = (\theta_0^T, \theta_n^T)^T$. Note, the linearization may also be performed around a nominal state and non-zero velocity in some embodiments. Let $\tau_0$ be the joint torques required to maintain the nominal pose, then $\tau_0$ satisfies $$0_n = \Phi_0 S^T \tau_0 + \phi_0 \qquad (8)$$

where $\Phi_0 = \Phi_0(\theta_0)$ and $\phi_0 = \phi(\theta_0, \theta_n)$. When the pose and velocity change by small amounts $\delta\theta$ and $\delta\dot{\theta}$, respectively, the equation of motion becomes $$\delta\ddot{\theta} = \Phi(\theta_0 + \delta\theta) S^T \tau + \phi(\theta_0 + \delta\theta, \delta\dot{\theta}). \qquad (9)$$

Defining $\tau = \tau_0 + \delta\tau$, using equation (8), and omitting second order terms of small changes gives $$\delta\ddot{\theta} = \Phi_0 S^T \delta\tau + (\Phi_\tau' + \Phi_p')\delta\theta + \phi_v' \delta\dot{\theta} \qquad (10)$$

$$= \Phi_0 S^T \delta\tau + \Gamma \delta\theta + \Lambda \delta\dot{\theta}$$

where $\Phi_T' = \delta(\Phi_0 S^T \tau_0)/\delta\theta$, $\phi_p' = \delta\phi/\delta\theta$, and $\Phi_v' = \delta\phi/\delta\dot{\theta}$.

At step 220, the simplification application performs a singular value decomposition (SVD) of the inverse inertial matrix for constrained system $\Phi_0$. Because $\Phi_0$ is symmetric and positive semi-definite, its SVD results in $$\Phi_0 = U\Sigma U^T \quad (11)$$

where $U \in R^{n \times n}$ is an orthogonal matrix containing singular vectors and $\Sigma \in R^{n \times n}$ is a diagonal matrix whose diagonal elements $\sigma_i (i=1, 2, \ldots, n)$ are the singular values of $\Phi_0$ and are sorted in the descending order ($\sigma_1 \geq \sigma_2 \geq \ldots \geq \sigma_n \geq 0$).

$\Phi_0$ may be approximated by selecting non-zero diagonal elements of $\Sigma$ and corresponding columns of U such that $$\Phi_0 \approx \hat{\Phi}_0 = \hat{U}\hat{\Sigma}\hat{U}^T \quad (12)$$

where $\hat{U} \in R^{n \times n}$ and $\hat{\Sigma} \in R^{k \times k}$. Plugging equation (12) into equation (10) yields $$\delta\ddot{\theta} = \hat{U}\hat{\Sigma}\hat{U}^T S^T \delta\tau + \Gamma\delta\theta + \Lambda\delta\dot{\theta} \quad (13)$$

Because $\hat{U}^T\hat{U} = 1_{k \times k}$, left-multiplying both sides of equation (13) by $\hat{U}^T$ gives $$\hat{U}^T \delta\ddot{\theta} = \hat{\Sigma}\hat{U}^T S^T \delta\tau + \hat{U}^T\Gamma\delta\theta + \hat{U}^T\Lambda\delta\dot{\theta} \quad (14)$$

Note, a mapping from the generalized coordinates of the simplified model to those of the full model may be formulated based on the power that inputs to the full model and the simplified model do. Let a mapping from the full model configuration to the simplified model configuration be defined by $$\delta\theta = \hat{U}q \quad (15)$$

A possible inverse mapping may then be $$q = \hat{U}^T\delta\theta. \quad (16)$$

The input torque mapping may be based on the power that inputs to the full model and the simplified model do. The power that the inputs to the full model do is $$\delta\dot{\theta}^T S^T \tau = \dot{q}^T \hat{U}^T S^T \delta\tau. \quad (17)$$

This power can be matched to the power of the simplified model by mapping the inputs by $$u = \hat{U}^T S^T \delta\epsilon. \quad (18)$$

Plugging into equation (14) gives $$\ddot{q} = \hat{\Sigma}u + \hat{U}^T\Gamma\delta\theta + \hat{U}^T\Lambda\delta\dot{\theta} \quad (19)$$

Note, the right-hand side of equation 19 has the same form as equation (6), with $$\hat{M}^{-1} = \hat{\Phi} = \hat{\Sigma} \quad (20)$$

$$\hat{G} = -\hat{\Sigma}^{-1}\Gamma\hat{U} \quad (21)$$

$$\hat{C} = -\hat{\Sigma}^{-1}\Lambda\hat{U} \quad (22)$$

because $\hat{\Sigma}$ is a diagonal matrix with positive elements.

At step 230, the simplification application selects singular values and corresponding singular vectors from the SVD by minimizing a difference in kinetic energy between the full and the simplified models, and determines the inertial term $\hat{\Phi}$ in equation (6). A commonly-used technique for dimensionality reduction keeps larger singular values of $\Sigma$ and corresponding singular vectors of U. However, this technique may not preserve the essential properties of a full dynamics model.

The dynamics of a physical system is often characterized by kinetic energy. Given that $\Phi_n$ is the inverse inertia matrix of the constrained system and is singular, let $\overline{\Phi}_c$ be defined as $$\overline{\Phi}_0 = \overline{U}\overline{\Sigma}\overline{U}^T \quad (23)$$

where $\overline{\Sigma}$ is a diagonal matrix whose diagonal elements are nonzero singular values of $\Phi_0$ and $\overline{U}$ is the matrix composed of the singular vectors corresponding to the nonzero singular values. The inverse of $\overline{\Phi}_0$ may be defined as $$\overline{\Phi}_0^{-1} = \overline{U}\overline{\Sigma}^{-1}\overline{U}^T \quad (24)$$

which is essentially the inertia matrix of the constrained system, as the robot cannot move in the directions of the singular vectors of the zero singular values. The kinetic energy is therefore $$T = \frac{1}{2}\dot{\theta}^T\overline{\Phi}_0^{-1}\dot{\theta}. \quad (25)$$

On the other hand, based on equations (12), (16), and (20), the kinetic energy of the simplified model is $$\hat{T} = \frac{1}{2}\dot{q}^T\hat{M}\dot{q} \quad (26)$$

$$= \frac{1}{2}\dot{q}^T\hat{\Sigma}^{-1}\dot{q}$$

$$= \frac{1}{2}\delta\dot{\theta}^T\hat{U}\hat{\Sigma}^{-1}\hat{U}^T\delta\dot{\theta}$$

$$= \frac{1}{2}\dot{\theta}^T\hat{\Phi}_0^{-1}\dot{\theta}.$$

In order to match the kinetic energies T and $\hat{T}$, the simplification application may attempt to make $\hat{\Phi}_0^{-1} \approx \overline{\Phi}_0^{-1}$ by choosing the largest singular values of $\overline{\Phi}_0^{-1}$ or, in other words, the smallest nonzero singular values of $\Phi_0$. Let the singular values of $\Phi_0$ by organized as $\sigma_1 \geq \sigma_2 \geq \ldots \geq \sigma_l > \sigma_{l+1} = \sigma_{l+2} = \ldots \sigma_n = 0$, where l is the index of the last nonzero singular value. Then the simplification application may keep the smallest k nonzero singular values ($\sigma_{l-k+1}$ to $\sigma_l$) in $\hat{\Sigma}$ and their corresponding singular vectors in U.

At step 240, the simplification application determines the gravitational forces $\hat{G}$ and velocity-dependent forces $\hat{C}$ matrices in equation (6) by computing active joint torques $\tau$ at poses around a nominal pose. In one embodiment, the simplification application may determine $\hat{G}$ by randomly sampling a number of poses around the nominal pose $\theta_0$ and computing the joint torques for realizing $\dot{\theta}=0_n$ and $\ddot{\theta}=0_n$ at each sample via inverse kinematics. Let the difference between $\theta_0$ and the i-th sample pose be $\Delta\theta_i$. Using inverse kinematics, the simplification application may modify $\Delta\theta_i$ to $\Delta\theta_i'$ so that the pose $\theta_0+\Delta\theta_i'$ satisfies the contact constraints. The simplification application may then determine joint torques $\tau_i$ required to produce zero accelerations. Using the mapping equations (16) and (18), the joint torques $\tau_i$ may be converted to those of the simplified model and plugged into equation (5), giving $$\hat{G}\hat{U}^T\Delta\theta_i' = \hat{U}^T S^T \tau_i. \quad (27)$$

Based on equation (27), the simplification application may collect $\Delta\theta_i'$ and $\tau_i$ values from a number of random sample poses around the nominal pose $\theta_0$ and solve a linear equation in the elements of $\hat{G}$ to obtain a $\hat{G}$ that best fits the samples.

Similarly or the $\hat{C}$ matrix, the simplification application may sample $\Delta\ddot{\theta}$ as well as $\Delta\theta$ from a number of random poses around the nominal pose $\theta_0$. The simplification application may then determine accelerations that satisfy the kinematic constraints of equation (3), as opposed to the zero accelerations for determining $\hat{G}$, and compute the corresponding joint torques. Because the $\hat{\Phi}$ matrix and the $\hat{G}$ matrix are known from earlier steps, a linear equation may be formed in the elements of $\hat{C}$. The simplification application may solve such a linear equation to determine the elements of $\hat{C}$.

Once $\hat{E}$, $\hat{G}$, and $\hat{C}$ are known, the linear state-space model of equation (7) may be obtained by using these matrices in equation (7).

Figure 3:
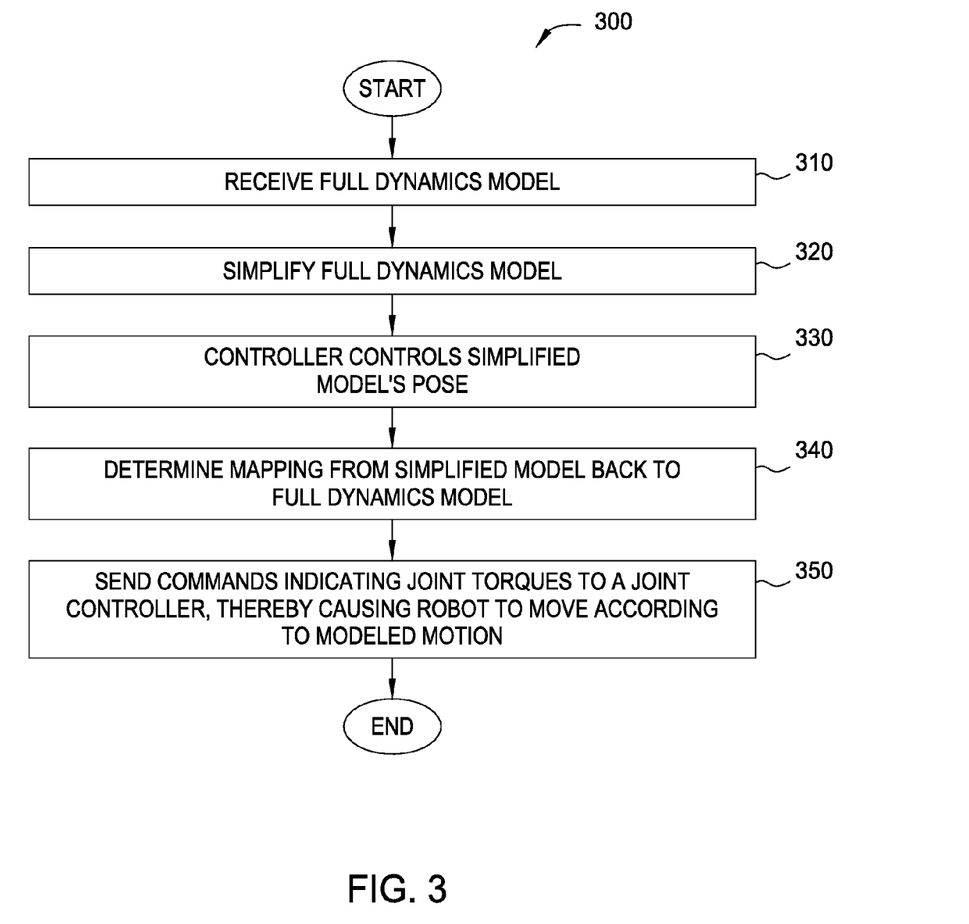
FIG. 3 illustrates a method for controlling a robot to perform a motion using a simplified dynamics model, according to an embodiment of the invention

FIG. 3 illustrates a method 300 for controlling a robot to perform a motion using a simplified dynamics model, according to an embodiment. At step 310, a simplification application receives a full dynamics model of the robot and, at step 320, the simplification application simplifies the full model. As discussed above with respect to FIG. 2, the simplification application may simplify the full model based on the state-space model of equation (7) by computing the $\hat{\Phi}$ matrix in equation (6) by singular value decomposition of $\Phi_0$, and obtaining $\hat{G}$ and $\hat{C}$ in equation (6) by computing $\tau$ at random poses around a nominal pose and solving for $\hat{G}$ and $\hat{C}$. In one embodiment, steps 310 and 320 may be performed offline (e.g., performed only once before running the robot), while steps 330-350 may be performed in realtime (e.g., performed at every control cycle).

At step 330, a controller controls the simplified model. In one embodiment, infinite-horizon linear quadratic regulators (LQRs) are used for controlling the simplified models. An LQR determines the input by state feedback u=−Kx, where K is a constant gain matrix. K is determined such that the closed loop system is asymptotically stable and a cost function $$J=\int_0^\infty (x^T Q x + u^T R U) dt \quad (28)$$

is minimized, where Q is a positive semi-definite matrix and R is a positive definite matrix.

A full-state observer may be used by the simplified model to estimate the state of the simplified model based on the measurements from a robot. Joint angle measurements give $\delta\theta$ in equation (16), which then gives the joint angles of the simplified model q. The observer may take q as a measurement and estimate the state q and $\dot{q}$ of the simplified model. In one embodiment, the full-state observer may first compute the difference of the simplified model's pose from the nominal pose for the controller, and then multiply this difference by $\hat{U}^T$. The observer's gain may be computed by pole assignment. Note, the state estimation does not require contact force measurement.

At step 340, the simplification application determines a mapping from the simplified model back to the full model. The input mapping of equation (18), namely $u=\hat{U}^T S^T \delta\tau$, gives a unique mapping from the full model to the simplified model, but the reverse mapping is not unique. As a result, other factors may be considered to determine joint torques for the full model.

In one embodiment, the controller designed for the simplified model may compute desired input u* to the simplified model, and an optimization problem may be formulated for computing the joint torque $\tau$ and expected contact forces $f_c$ of the full model, taking into account reference trajectories for the joints because the controller for the simplified model may not consider individual joints. An example cost function for the optimization problem may be $$Z = \frac{1}{2} Z_u + \frac{1}{2} Z_a + \frac{1}{2} \tau^T W_\tau \tau_c + \frac{1}{2} f_c^T W_c f_c. \quad (29)$$

Where the first and second terms address the desired input u* and reference trajectories, respectively, and the last two terms are damping terms with constant, positive-definite weight matrices $W_\tau$ and $W_C$ for the joint torque and contact forces, respectively. In one embodiment, these weight matrices may be user-specified. $Z_u$ may be defined as $$Z_u = (u^* - \hat{U}^T \tau)^T W_u (u^* - \hat{U}^T \tau) \quad (30)$$

where $W_u$ is a constant weight matrix that may also be user-specified. To determine joint trajectories, joint acceleration may first be determined by $$\ddot{\theta}^* = \ddot{\theta}_{ref} + k_d (\dot{\theta}_{ref} - \dot{\theta}) + k_p (\theta_{ref} - \theta) \quad (31)$$

and defining $Z_a$ as $$Z_a = (\ddot{\theta}^* - \ddot{\theta})^T W_a (\ddot{\theta}^* - \ddot{\theta}) \quad (32)$$

where $W_a$ is a constant weight matrix. The final optimization problem is then to find joint torque $\tau$ and expected contact forces $f_c$ that minimize the cost function of equation (29), subject to the equation of motion (1). Optionally, constraints on joint torques may be considered to enforce joint torque limitations. $f_c$ may also be constrained such that it satisfies the constraints on vertical forces, center of pressure, and friction.

At step 350, the controller sends commands indicating the joint torques, mapped from the simplified model to the full-dynamics model according to the mapping determined at step 340, to a joint controller capable of configuring the articulated link positions of a humanoid robot by applying the joint torques, thereby causing the robot to move according to the modeled motion. In one embodiment, multiple models and controllers with different nominal poses and contact constraints may be used to generate complex motions, such as stepping. The conditions for switching between controllers may be manually (or automatically) defined according to, e.g., the number of contacts of current and next models. For example, if the next model has fewer contact links than the current model, the switch may take place when the vertical contact for a foot to be lifted is under a given force measurement for a given number of frames. Similarly, if the next model has more contact links, a switch may take place when the vertical contact force at the foot touching down is above a given force measurement threshold for a given number of frames, in order to confirm that the new contact is established. Note, the controller may not achieve the contact force condition for switching to another controller. In one embodiment, this problem is solved by increasing the elements of $W_c$ in equation (29) that correspond to the foot to be lifted when the vertical contact force for the foot is lower than a given threshold. Similarly, if the contact force at a foot needs to be larger in order to establish a contact, the weights corresponding to the other foot may be increased when the vertical contact force rises above a given threshold.

Figure 4:
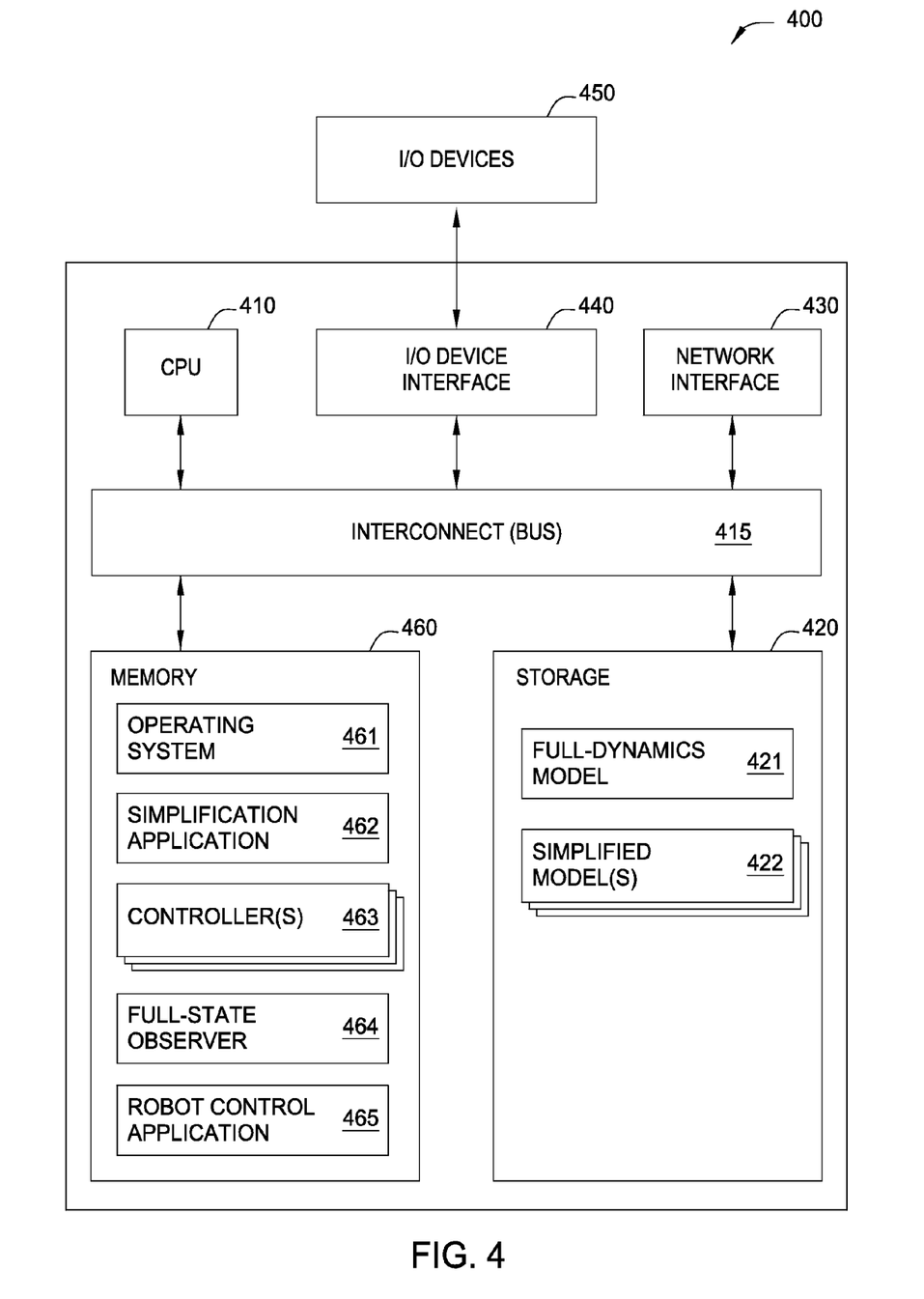
FIG. 4 depicts a block diagram of a system in which an embodiment may be implemented.

FIG. 4 depicts a block diagram of a system in which an embodiment may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400. The I/O devices 440 and 450 may include a joint controller capable of configuring the articulated link positions of a humanoid robot by modifying the angles of joints of the humanoid robot.

The CPU 410 retrieves and executes programming instructions stored in the memory 460. Similarly, the CPU 410 stores and retrieves application data residing in the memory 460. The interconnect 615 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, and the like. And the memory 460 is generally included to be representative of a random access memory. The storage 420 may be a disk drive storage device. Although shown as a single unit, the storage 420 may be a combination of fixed and/or removable storage devices, such as fixed disc drives, floppy disc drives, tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network. Also, the functions of controlling the joint articulation of a robot may be separate from the systems and applications described herein used to simplify full dynamics models, and are included in system 400 for convenience of description.

As shown, the memory 460 includes an operating system 461 and applications 462-465. Illustratively, the operating system may include Microsoft's Windows®. The applications 462-465 include a simplification application 462, which is configured to simplify a full-dynamics model 421 into a simplified model 422 that represents the essential properties of the full dynamics. In one embodiment, the simplification application 462 may be configured to linearize the full model 421 around a nominal state, perform SVD on an inverse inertia matrix of a system constrained by contact constraints and select singular values and corresponding singular vectors to be kept in the simplified model 422, and determine a gravitational forces term and a velocity-dependent forces term 422 by sampling torques at a number of poses around the nominal state, as described in detail above with respect to FIG. 2. The applications 462-465 further include controller application(s) 463, which are each configured to control one or more simplified models 422. In one embodiment, the controller(s) 463 may be infinite-horizon linear quadratic regulators, but other controller choices may also be used. As discussed, multiple simplified models 422 and controllers 463 corresponding to different nominal poses and contact constraints may be used to generate complex motions, such as stepping. The applications 462-465 also include a full-state observer 464 which estimates states of the simplified models 422 based on measurements from the robot, as discussed above with respect to FIG. 3.

The applications 462-465 further include a robot control application 465, which may be configured to send signals to a robot indicating the joint torques to exert. That is, the robot control application may convert calculated joint torques to instructions that are sent to the robot, thereby causing joints of the robot to move according to those instructions.

Advantageously, techniques disclosed herein permit full dynamics models of robots to be simplified. Conventionally, the controller developer must decide which mechanical model represents essential properties of dynamics of a robot, and mapping the state and input between models often requires model-specific code. By contrast, techniques described herein may be completely automated once contact constraints, nominal pose, and number of generalized coordinates of the simplified model are specified. The mapping between the states and inputs of the full and simplified models may also be obtained automatically in the same way for any simplified models obtained by techniques disclosed herein. Such a mapping has a simple linear relationship which does not require model-specific programs. As a result, simplified models for different poses and contact constraints may easily be derived, and switches among them may be made using the same program to, e.g., generate complex motions that sequentially combine multiple models and controllers.

While the foregoing is directed to aspects of the present invention, other and further aspects of the invention may be devised without departing from the basic scope thereof, and the scope thereof is determined by the claims that follow.

What is claimed is:

1. A computer-implemented method for controlling a robot using a robot model, comprising:
   performing a singular value decomposition of an inertial term of a robot model;
   simplifying the robot model to obtain a first simplified model, wherein the simplifying includes determining singular values and corresponding singular vectors from the singular value decomposition to keep in an inertial term of the first simplified model by matching a kinetic energy of the robot model and a kinetic energy of the first simplified model;
   controlling the first simplified model using a first controller to determine first joint torque inputs to achieve a control objective with the first simplified model;
   optimizing a cost function to determine joint torques and expected contact forces for the robot model using the first joint torque inputs and joint reference trajectories; and
   controlling the robot using the determined joint torques and expected contact forces.

2. The method of claim 1, further comprising, linearizing the robot model around a first nominal state.

3. The method of claim 2, further comprising, determining a gravitational forces term and a velocity-dependent forces term of the first simplified model by computing joint torques at sample poses around the first nominal state and solving for the gravitational forces term and the velocity-dependent forces term.

4. The method of claim 1, wherein the first controller is an infinite-horizon linear quadratic regulator.

5. The method of claim 1, further comprising, switching to a second controller and a second simplified model associated with a second nominal state to perform a motion.

6. The method of claim 1, wherein the first simplified model has k degrees of freedom, wherein the robot model has n degrees of freedom, wherein k is less than n, wherein the inertial term is an inverse inertial matrix of a system constrained by contact constraints, and wherein a smallest k nonzero singular values and corresponding singular vectors are kept in the first simplified model.

7. The method of claim 6, wherein a value of k is automatically determined.

8. A non-transitory computer-readable storage media storing instructions, which when executed by a computer system, perform operations for controlling a robot, the operations comprising:
   performing a singular value decomposition of an inertial term of a robot model;
   simplifying the robot model to obtain a first simplified model, wherein the simplifying includes determining singular values and corresponding singular vectors from the singular value decomposition to keep in an inertial term of the first simplified model by matching a kinetic energy of the robot model and a kinetic energy of the first simplified model;
   controlling the first simplified model using a first controller to determine first joint torque inputs to achieve a control objective with the first simplified model;
   optimizing a cost function to determine joint torques and expected contact forces for the robot model using the first joint torque inputs and joint reference trajectories; and
   controlling the robot using the determined joint torques and expected contact forces.

9. The computer-readable storage media of claim 8, the operations further comprising, linearizing the robot model around a first nominal state.

10. The computer-readable storage media of claim 9, the operations further comprising, determining a gravitational forces term and a velocity-dependent forces term of the first simplified model by computing joint torques at sample poses around the nominal state and solving for the gravitational forces term and the velocity-dependent forces term.

11. The computer-readable storage media of claim 8, wherein the first controller is an infinite-horizon linear quadratic regulator.

12. The computer-readable storage media of claim 8, the operations further comprising, switching to a second controller and a second simplified model associated with a second nominal state to perform a motion.

13. The computer-readable storage media of claim 8, wherein the first simplified model has k degrees of freedom, wherein the robot model has n degrees of freedom, wherein k is less than n, wherein the inertial term is an inverse inertial matrix of a system constrained by contact constraints, and wherein a smallest k nonzero singular values and corresponding singular vectors are kept in the first simplified model.

14. The computer-readable storage media of claim 13, wherein a value of k is automatically determined.

15. A system, comprising:
   a processor; and
   a memory, wherein the memory includes an application program configured to perform operations for controlling a robot, the operations comprising:
   performing a singular value decomposition of an inertial term of a robot model,
   simplifying the robot model to obtain a first simplified model, wherein the simplifying includes determining singular values and corresponding singular vectors from the singular value decomposition to keep in an inertial term of the first simplified model by matching a kinetic energy of the robot model and a kinetic energy of the first simplified model,
   controlling the first simplified model using a first controller to determine first joint torque inputs to achieve a control objective with the first simplified model,
   optimizing a cost function to determine joint torques and expected contact forces for the robot model using the first joint torque inputs and joint reference trajectories, and
   controlling the robot using the determined joint torques and expected contact forces.

16. The system of claim 15, the operations further comprising:
   linearizing the robot model around a nominal state; and
   determining a gravitational forces term and a velocity-dependent forces term of the first simplified model by computing joint torques at sample poses around the nominal state and solving for the gravitational forces term and the velocity-dependent forces term.

\* \* \* \* \*

UNITED STATES PATENT AND TRADEMARK OFFICE
CERTIFICATE OF CORRECTION

PATENT NO. : 9,031,691 B2
APPLICATION NO. : 13/784405
DATED : May 12, 2015
INVENTOR(S) : Katsu Yamane It is certified that error appears in the above-identified patent and that said Letters Patent is hereby corrected as shown below:

In the Specification

In the Background:

Column 1, Line 29, please delete "COMB" and insert --COMs-- therefor;

In Detailed Description:

Column 2, Line 25, please insert --$n$-- after having;

Column 4, Line 25, please delete "0," and insert --$0_*$-- therefor;

Column 4, Line 25, please delete "1," and insert --$1_*$-- therefor;

Column 4, Lines 61-62, please delete " $\hat{M} \in R^{k \times k}$ "

and insert -- $\hat{M} \in R^{k \times k}$ -- therefor;

Column 5, Line 63, please delete "z" and insert --$\tau$-- therefor;

Column 7, Line 6, please delete ":" and insert --$k$-- therefor;

Column 7, Line 10, please delete " $\hat{U} \in R^{n \times n}$ "

and insert -- $\hat{U} \in R^{n \times k}$ -- therefor;

Signed and Sealed this
Tenth Day of November, 2015

Michelle K. Lee
*Director of the United States Patent and Trademark Office*

CERTIFICATE OF CORRECTION (continued)

Column 7, Line 36, please delete "$u = \hat{U}^T S^T \delta\epsilon.$"

and insert -- $u = \hat{U}^T S^T \delta\tau.$ -- therefor;

Column 7, Line 58, please delete "$\Phi_n$"

and insert -- $\Phi_0$ -- therefor;

Column 7, Line 59, please delete "$\overline{\Phi}_c$"

and insert -- $\overline{\Phi}_0$ -- therefor;

Column 7, Line 60, please delete "$\overline{\Phi}_0 = \overline{U}\overline{\Sigma}\overline{U}^T$"

and insert -- $\overline{\Phi}_0 = \overline{U}\overline{\Sigma}\overline{U}^T$ -- therefor;

Column 7, Line 66, please delete "$\overline{\Phi}_0^{-1} = \overline{U}\overline{\Sigma}^{-1}\overline{U}^T$"

and insert -- $\overline{\Phi}_0^{-1} = \overline{U}\overline{\Sigma}^{-1}\overline{U}^T$ -- therefor;

Column 8, Line 29, please delete "1" and insert --*l*-- therefor;

Column 8, Line 34, please delete (first occurrence of) "$\hat{C}$"

and insert -- $\hat{G}$ -- therefor;

Column 8, Line 56, please delete "$\Delta\ddot{\theta}$"

and insert -- $\Delta\dot{\theta}$ -- therefor;

Column 8, Line 65, please delete "$E,$"

and insert -- $\overline{\Sigma},$ -- therefor.